United States Patent [19]

Hotomi et al.

[11] Patent Number: 5,515,085
[45] Date of Patent: May 7, 1996

[54] INK-JET TYPE RECORDER

[75] Inventors: Hideo Hotomi; Takamasa Ueda, both of Ibaragi; Osamu Ebisu, Toyonaka; Hideaki Ueda, Kawanishi, all of Japan

[73] Assignee: Minolta Camera Kabushiki Kaisha, Osaka, Japan

[21] Appl. No.: 969,921

[22] Filed: Oct. 15, 1992

[30] Foreign Application Priority Data

Oct. 17, 1991 [JP] Japan .................. 3-269335

[51] Int. Cl.⁶ ................ B41J 2/015; B41J 2/06
[52] U.S. Cl. ................................. 347/54; 347/6
[58] Field of Search .............. 346/140 R; 347/55, 347/95, 100, 6, 54

[56] References Cited

U.S. PATENT DOCUMENTS

| | | | |
|---|---|---|---|
| 3,553,708 | 1/1971 | Carreira et al. | 346/14 R |
| 4,014,693 | 3/1977 | Clark | 96/1 R |
| 4,480,259 | 10/1984 | Kruger et al. | 346/63 |
| 4,710,784 | 12/1987 | Nakayama | 346/140 R |
| 5,100,471 | 3/1992 | Winnik et al. | 106/23 |

FOREIGN PATENT DOCUMENTS

| | | |
|---|---|---|
| 62-60690 | 3/1987 | Japan . |
| 1-277839 | 11/1989 | Japan . |
| 2-99386 | 4/1990 | Japan . |
| 2-111548 | 4/1990 | Japan ..................... 347/88 |

*Primary Examiner*—Benjamin R. Fuller
*Assistant Examiner*—Craig A. Hallacher
*Attorney, Agent, or Firm*—Willian Brinks Hofer Gilson & Lione

[57] ABSTRACT

The present invention discloses an ink-jet type recorder comprising reserving means for withholding a recording liquid consisting of a mixture of electroviscous liquids (EVL) and coloring materials, the reserving means including a plurality of nozzles from which a jet of the recording liquid spouts out, and a plurality of pairs of electrodes for impressing a voltage to the recording liquid withheld in the reserving means, wherein the impressed voltage to the plurality of pairs of electrodes is controlled in order to change the viscosity of EVL so that a jet of the recording liquid spouts out from the plurality of nozzles onto recording media. Also the present invention discloses an ink-jet type recorder comprising reserving means having an EVL withholding unit for withholding EVL and a recording liquid by way of two separate liquid phases contacting each other at one end, and a plurality of pairs of electrodes for impressing a voltage to EVL withheld in the reserving means, wherein the impressed voltage to the pairs of electrodes is controlled in order to change the volume of EVL so that EVL directly pumps out the recording liquid onto recording media through the plurality of nozzles.

14 Claims, 10 Drawing Sheets

Fig. 5

| Particulars | EVL Model No.1 | EVL Model No.2 | EVL Model No.3 |
|---|---|---|---|
| Silicone Oil (wt%) | 92.8 | 95.01 | 96.15 |
| Colloidal Silica (wt%) | 5.8 | 2.37 | 2.4 |
| Water (wt%) | 0.6 | 1.42 | 1.45 |
| Silane Coupling agent (wt%) | 0.8 | 1.2 | — |
| Total Weight (g) | 25.85 | 42.1 | 41.6 |

Fig.13

| Composition | Ink No.1 | wt (%) | Ink No.2 | wt (%) | Ink No.3 | wt (%) | Ink No.4 | wt (%) |
|---|---|---|---|---|---|---|---|---|
| Dispersion Media | diethylene glycol monobutyl ether | 67 | furfuryl alcohol | 30 | triethylene glycol monobutyl ether | 78 | water | 67 |
|  |  |  | dipropylene glycol monomethyl ether | 53 |  |  |  |  |
| Pigment | carbon black (particle diameter : 0.2μm) | 5 | benzidine pigment (pigment yellow 13) | 6 | quinacridone pigment (pigment red 122) | 7 | copper phthalocyanine pigment (pigment blue 15) | 8 |
| Dispersion agent | polyoxy ethylene ethylether nonion | 5 | ethylsulfuric acid sodium salt anion of trioxyethylene octyether | 3 | same as left | 4 | nonion surfactant (Emargen A-60 :Kao Corporation) | 5 |
| Resin | borneol (masking agent) | 5 | polyvinyl butyral | 5 | rosin | 6 | polyvinyl alcohol | 44 |
| Adduct | water (anti-spreading) | 18 | polyethylene glycol | 3 | same as left | 4 | ethylene glycol | 8 |
|  |  |  |  |  |  |  | propylene glicol | 7 |
|  |  |  |  |  | perfume | 1 | anti-septics (Proxcel GXL : ICI-Pharma LTD.) | 0.5 |
|  |  |  |  |  |  |  | sodium hydroxide | 0.1 |

INK-JET TYPE RECORDER

BACKGROUND OF THE INVENTION

(1) Field of the Invention

The present invention relates to an ink-jet type recorder that records characters and images by spouting a jet of ink onto recording media.

(2) Description of the Related Art

Until recently, ink-jet type recorders in practical use have recorded the characters and images through ink adhesion to the recording media by exploiting a force acting toward the recording media with a use of piezoelectric-elements. However, high polymer gel such as artificial muscle polymers is proposed as an alternative of the piezoelectric-elements for possible cost reduction and downsizing.

For example, as is disclosed in Japanese Laid-Open Patent Application No. 2-99386, ink is absorbed in the high polymer gel that repeats contradiction/expansion with thermal or light energy; the ink adheres to the recording media when the force of an electric field in addition to the thermal or light energy are supplied thereto.

Japanese Laid-Open Patent Application No. 1-277839 discloses an image former composed of a transparent holder, and transparent electrode layers, photosensitive layers, mechanochemical layers, and fine pore layers, each alternately placed thereon; the mechanochemical layers made of the high polymer gel contract when electricity is supplied thereto, whereby the high polymer gel presses the ink absorbed therein out onto the recording media.

Likewise, Japanese Laid-Open Patent Application No. 62-60690 discloses the high polymer gel that repeats contradiction/expansion with electricity; the ink absorbed in the high polymer gel adheres to the recording media when it responds to electricity.

However, it is difficult to improve a recording speed with the ink-jet type recorders using these high polymer gel due to inferior response thereof. Also, it is difficult to adjust electricity when their compositions have changed as a result of desiccation. In addition, the quality of images deteriorates due to changes in expansion degrees caused by gradual adhesion of coloring materials on the high polymer gel in the course of the operation. Furthermore, with the recorder for a higher resolution, 16 dot/mm more or less, the high polymer gel, that retains a small amount of deviation, requires high energy and therefore invites an increase in manufacturing cost.

SUMMARY OF THE INVENTION

The present invention has an object to provide an inexpensive ink-jet type recorder that improves the recording speed while maintaining the satisfactory image quality.

The above object is fulfilled by exploiting properties of suspension of solid particles in insulate liquid dispersion media, or namely, Electroviscous Liquids (EVL): viscosity and/or volume of EVL change according to a voltage impressed thereto.

More precisely, with the ink-jet type recorder of the present invention, a recording liquid consisting of a mixture of EVL and the coloring materials is withheld in a space equipped with a plurality of nozzles, and the voltage impressed thereto is controlled in order to adjust a resisting force arising from the viscosity and surface tension of EVL. Given these circumstances, EVL retains high viscosity when impressed with the voltage, and as a result, the resisting force becomes stronger than electrostatic force, gravity and pressure acting on EVL, therefore making it impossible for EVL to spout out from the nozzles. On the contrary, the viscosity of EVL is lowered when the impress of the voltage is halted, and as a result, the resisting force becomes weaker than the electrostatic force, gravity, and pressure, enabling EVL to spout out from the nozzles and form an image on the recording media.

The recording liquid and EVL may be withheld in the space by way of two separate liquid phases contacting each other at one end. In this case, EVL directly pumps out the ink from the nozzles in order to form the image on the recording media when the voltage impress is halted, obviating a conventional mechanical assembly for a spout of the ink.

According to the present invention, the ink-jet type recorder can improve the recording speed while maintaining the satisfactory image quality, owing to EVL's superior response in material properties to the voltage and higher material stability than the high polymer gel. In addition, manufacturing cost thereof can be reduced given from the fact that EVL requires less energy as compared with the high polymer gel.

BRIEF DESCRIPTION OF THE DRAWINGS

These and other objects, advantages and features of the invention will become apparent from the following description thereof taken in conjunction with the accompanying drawings which illustrated specific embodiments of the invention. In the drawings:

FIG. 5 is a list of the EVL compositions utilized in the experiments;

FIG. 13 is a list of the pigment ink compositions utilized in the experiments;

DESCRIPTION OF THE PREFERRED EMBODIMENT (Embodiment I)

Firstly, experiments on changes in viscosity and volume of EVL were carried out.

Figure 1:
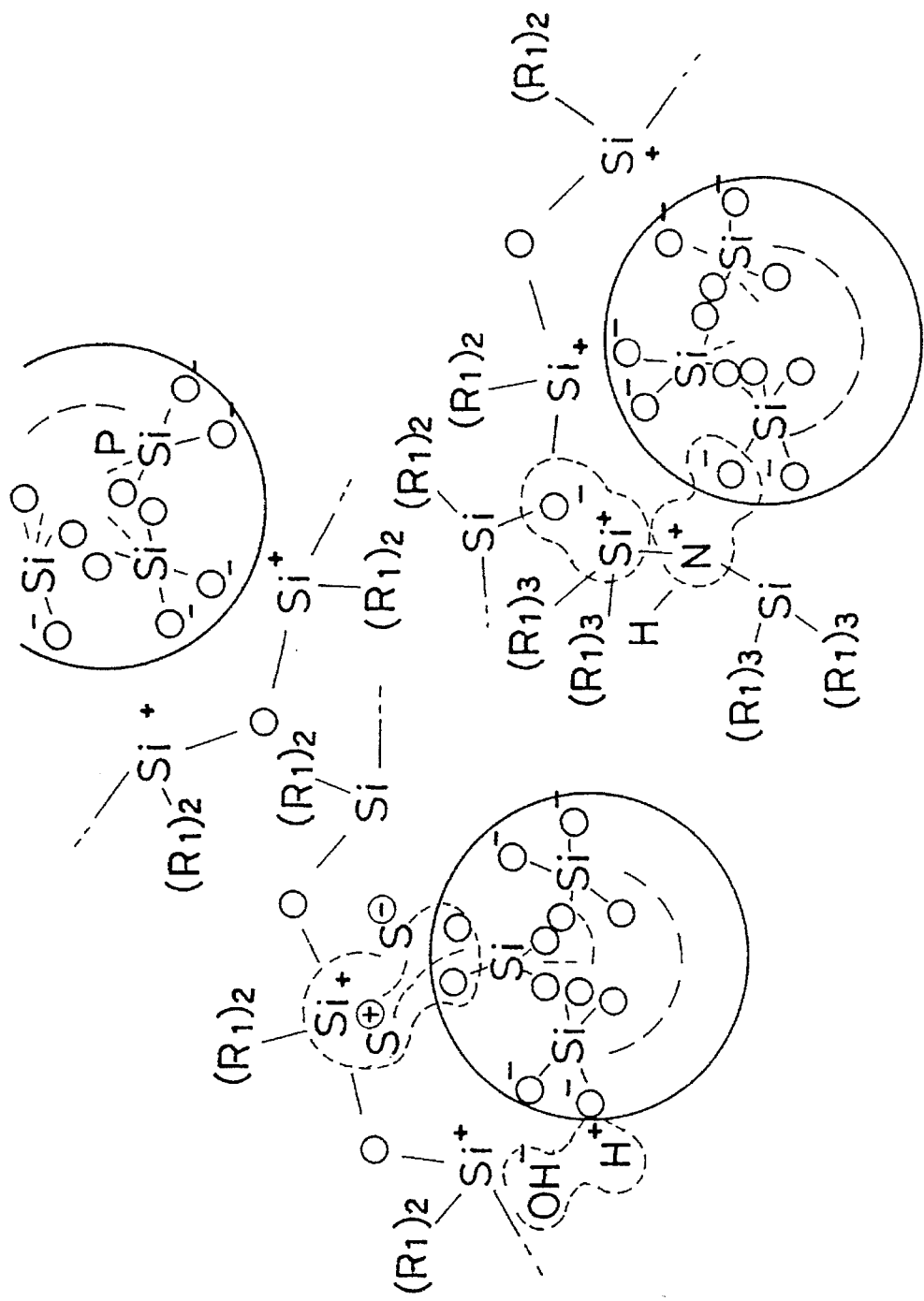
FIG. 1 is an illustration of the EVL composition.

As previously mentioned, EVL, referred to as a viscosity changeable liquid herein, is suspension of solid particles in insulate liquid dispersion media. Utilized as liquid dispersion media are: fluorine compounds such as Freon solve, mineral oil, and silicone oil, synthesized hydrocarbons such as isoparaffin series hydrocarbon. Utilized as solid particles are hydrate polymer particles such as absorption polymer crosslinking particles and ion exchange resin particles, zeolite particles, silica gel particles, and ceramics particles. EVL utilized herein was produced by mixing silicone oil (SH200-2 cp Dimethyl Silicone Oil; Toray Silicone Co., Ltd.), water, a silane coupling agent (H7300 Hexamethyl, EG Disilazan; Chisso Corporation), and colloidal silica (R972 particle diameter M–0.02 m; Nippon Aerosil Co., Ltd) for approximately two hours in a jar with glass beads and using a red devil. The composition thereof is illustrated in FIG. 1 with numeral 1 denoting a methyl group.

Figure 2:
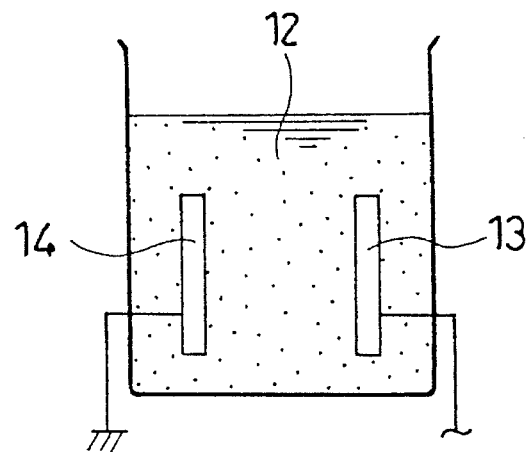
FIG. 2 is a view explaining the change of EVL.
Figure 3:
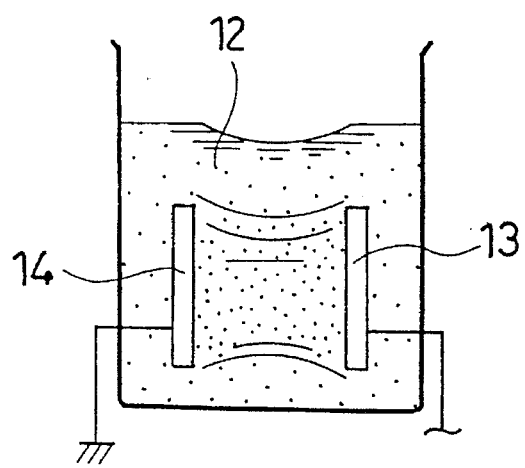
FIG. 3 is a view explaining the change of EVL.

As shown in FIGS. 2 and 3, electrodes 13 and 14 are placed in EVL 12 so as to oppose each other. The electrode 13 is connected to a positive or negative power source through a switch while the electrode 14 is connected to a grounding.

Figure 4:
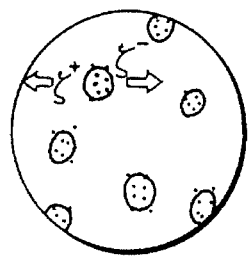
FIG. 4 is a view explaining the change of EVL.

When no voltage is impressed to the electrode 13, the electric field does not develop between the electrodes 13 and 14, thus, the viscosity of EVL remains low. On the other hand, once the voltage is impressed, the electric field starts to develop, and accordingly, EVL decreases in volume while at the same time increasing in viscosity. As is shown in FIG. 4, the reason for such changes in volume and viscosity according to the impressed voltage is that because $\zeta$ (zeta) potential portion of colloidal silica dispersion in silicone oil is pulled toward the positive or negative electrode 13 or 14, whereas a counter charging portion of silicone oil is pulled toward the opposite direction, making static electricity well balanced and producing high viscous EVL as an outcome. It is to be noted that the above events occur reversibly when the voltage impress is halted.

Figure 6:
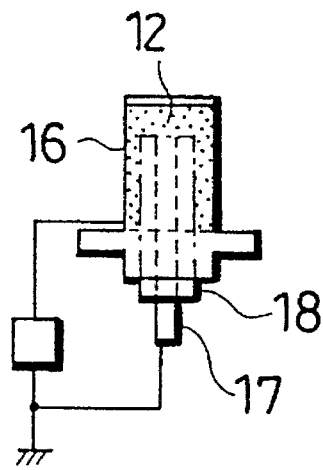
FIG. 6 is a schematic cross sectional view of a measuring cell that measures response in electric properties of EVL.
Figure 7:
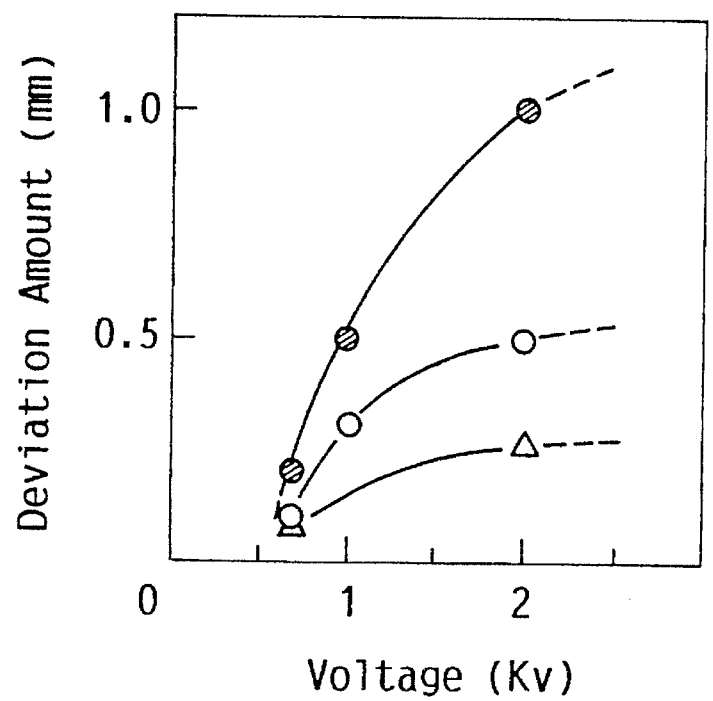
FIG. 7 is a graph showing a correlation between the voltage and deviation amount of EVL.
Figure 8:
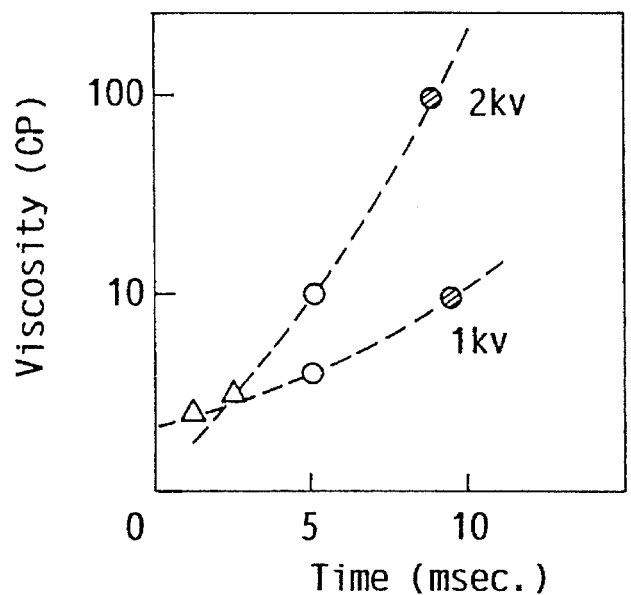
FIG. 8 is a graph showing a correlation between the voltage impressing time and viscosity of EVL.
Figure 9:
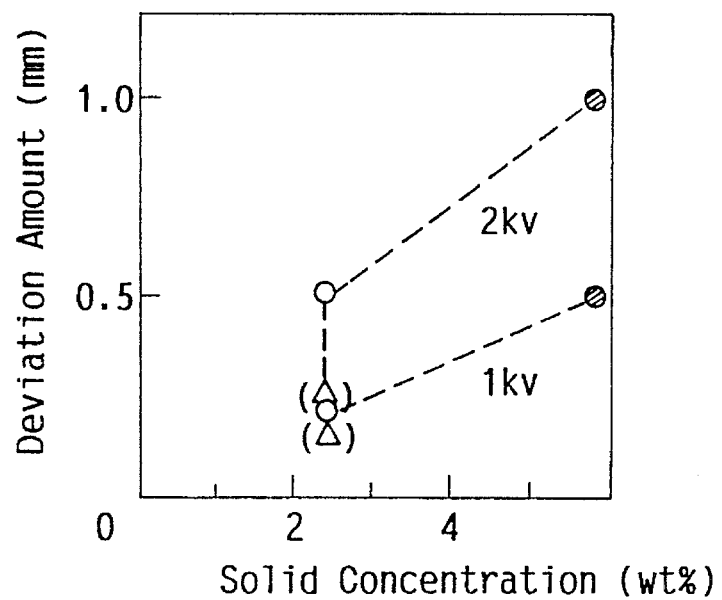
FIG. 9 is a graph showing a correlation between the solid concentration and deviation amount of EVL.
Figure 10:
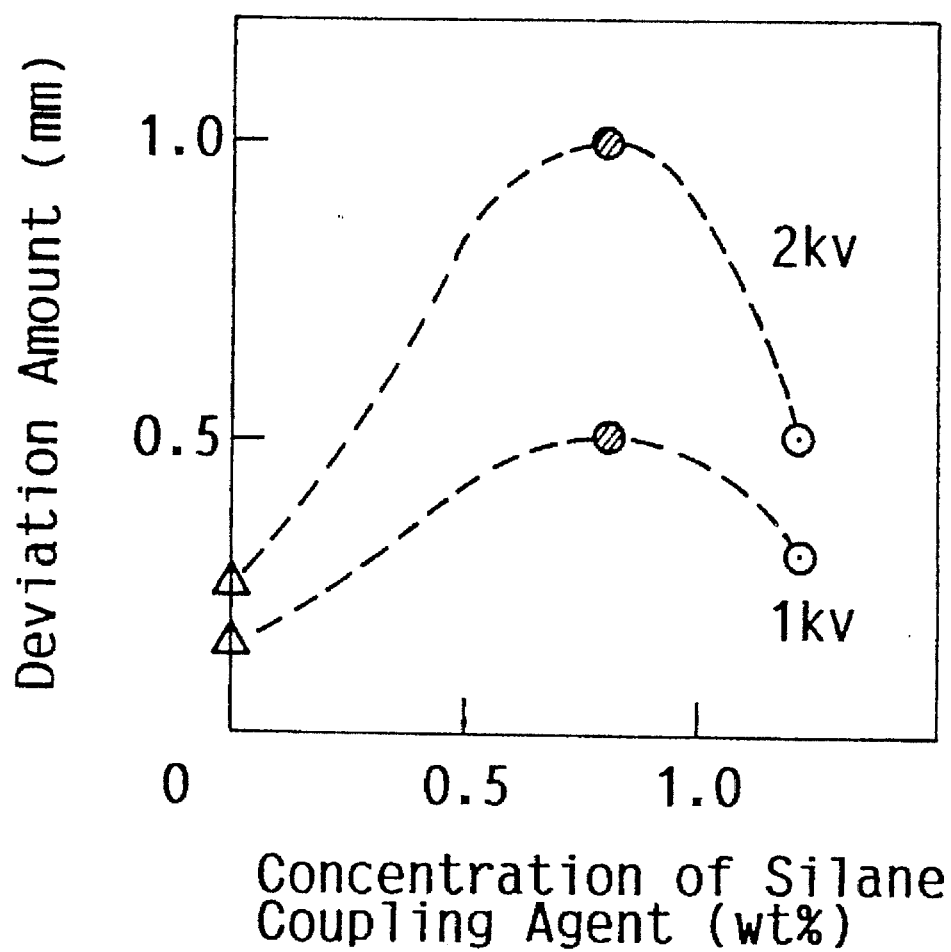
FIG. 10 is a graph showing a correlation between the concentration of a silane coupling agent and deviation amount of EVL.

Secondary, electric properties of EVL (model nos. 1–3) with compositions listed in FIG. 5 were studied using a measuring cell as shown in FIG. 6. The measuring cell is composed of a cylindrical electrode 16, a round-bar earth electrode 17 placed concentrically inside thereof, and a fluororesin cylinder 18 placed therebetween, and it measured the deviation t of the liquid level of EVL 12 when the voltage was impressed between the electrode 16 and earth electrode 17. The results of the study are on FIGS. 7–10, wherein a mark refers to as EVL model no. 1, a mark to as EVL model no. 2, and a mark to as EVL model no. 3: FIG. 7 is a graph for a correlation between the voltage and deviation amount of EVL; FIG. 8 is one for a correlation between the voltage impressing time and viscosity of EVL; FIG. 9 is one for a correlation between the solid concentration and deviation amount of EVL; and FIG. 10 is one for a correlation between the concentration of the silane coupling agent and deviation amount of EVL.

As can be seen from these graphs, it was acknowledged that not only the viscosity but also the volume thereof changed when EVL was influenced by an electric field.

Figure 11:
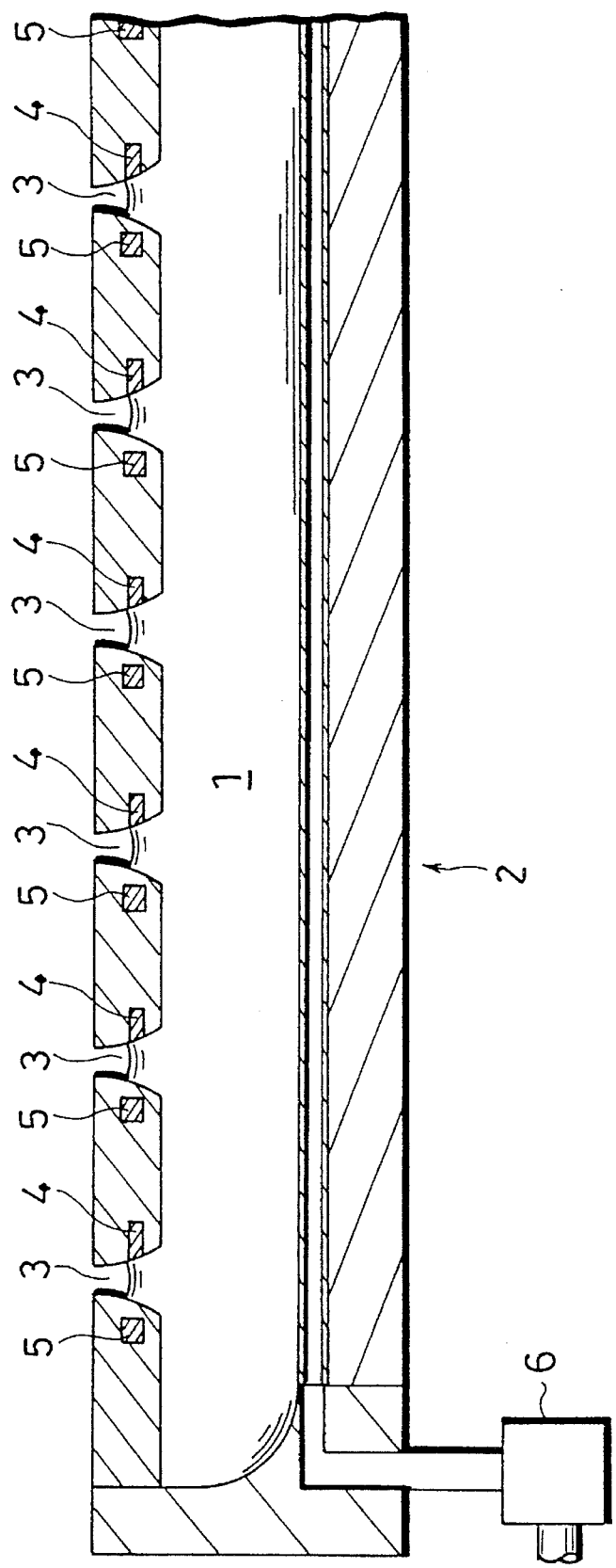
FIG. 11 is a schematic cross sectional view of the major part of the ink-jet type recorder according to Embodiment I of the present invention.
Figure 12:
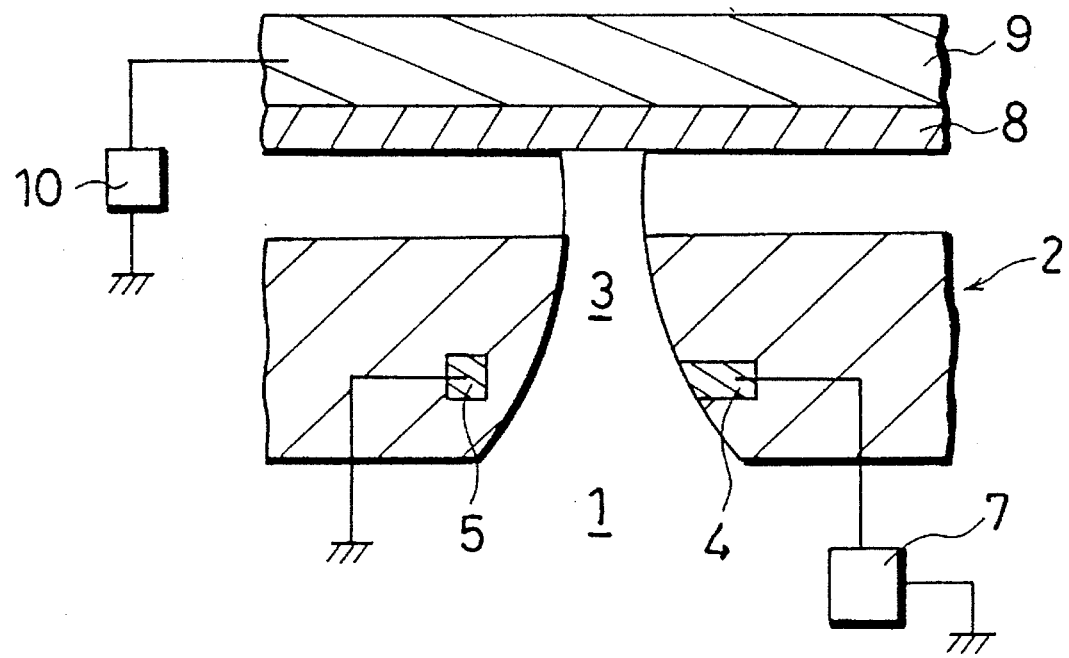
FIG. 12 is an enlarged schematic cross sectional view of the major part of the ink-jet type recorder according to Embodiment I of the present invention.

In order to exploit such properties of EVL, the ink-jet type recorder of Embodiment I has a construction as shown in FIGS. 11 and 12.

FIG. 11 is a schematic cross sectional view of the major part of the ink-jet type recorder according to Embodiment I. The recorder is composed of a recording liquid 1, a space 2, a plurality of tapered nozzles 3 placed at regular intervals, and a plurality of pairs of separate electrodes 4 and opposing common electrodes 5, between which the electric field develops in the recording liquid 1. The recording liquid 1, or a mixture of pigment dispersion ink and the viscosity changeable liquid, is supplied into the space 2 from an unillustrated ink tank through a filter 6.

FIG. 12 is an enlarged schematic cross sectional view of the major part of the ink-jet type recorder. Each separate electrode 4 is connected to the output terminal of respective voltage impressers 7 which impress the voltage ranging from 80 to 300 V depending on an image signal thereto, while all the common electrodes 5 are connected through to the grounding. A recording sheet 8 used as the recording media is placed 0.1–1 mm away from the openings of the nozzles 3, and it maintains a contact with an attraction electrode 9 connected to an attraction bias power source 10 that impresses the voltage ranging, for instance, from 900 to 3000 V. An unillustrated charging electrode is placed around the openings of the nozzles 3 so as to charge the recording liquid 1 with a reverse polarity to that of the attraction electrode 9, causing the recording liquid 1 to be attracted to the recording sheet 8 from the nozzles 3.

Constructed as above, the ink-jet type recorder operates as follows. When the voltage impressers 7 impress a given voltage to the respective separate electrodes 4, the electric field starts to develop between the separate electrodes 4 and common electrodes 5, decreasing the volume of the viscosity changeable liquid included in the recording liquid 1 while at the same time increasing the viscosity thereof. As a result, the force of the static electricity trying to spout out a jet of the recording liquid 1 from the nozzles 3, and other forces acting in opposite direction such as surface tension of the recording liquid 1 come to balance, making such spouting impossible. When the voltage impressers 7 halt the impress of the voltage to the electrodes 4, the electric field disappears, increasing the volume of the viscosity changeable liquid while at the same time decreasing the viscosity thereof. Accordingly, the recording liquid 1 in the nozzles 3 moves toward to the recording sheet 8, and is attracted thereto, as being charged with the reverse polarity to that of the attraction electrode 9. With synergistic effect of inertia force from the move of the recording liquid 1 and the electrostatic attraction, a jet of the recording liquid 1 spouts out onto the recording sheet 8. While each nozzles 3 repeats the above operation according to the image signal, the image is formed on the recording sheet 8 which is forwarded vertically to the installation of the nozzles 3 with a given timing.

Finally, experiments were carried out using the above ink-jet type recorder and the recording liquids made through the dispersion of the pigment dispersion ink as listed in FIG. 13 (ink nos. 1–4), and EVL as listed in FIG. 5 (model nos. 1–3).

From the results of these experiments, it was acknowledged that the ink-jet type recorder of Embodiment I improved the recording speed due to higher response of the viscosity changeable liquid, while maintaining satisfactory image quality owing to higher material stability thereof as to compared with the one utilizing the high polymer gel.

In respect of EVL, other compositions than the one utilized in the above may be utilized: it may contain 95.8 percent isoparaffin series hydrocarbon as the dispersion media (IP Solvent 1620; Idemitsu Petrochemical Co., Ltd or Isoper H; Esso Sekiyu K.K.), 4 percent potassium titanate whiskers (Titan Kogyo K.K.) as the solid particles, and 0.2 percent sodium stearate by weight, or 95.5 percent Freon solve as the dispersion media, 3.9 percent zeolite as the solid particles, and 0.6 percent propanol by weight.

Also other organic solvent as follows may be utilized in the pigment dispersion ink consisting of the recording liquid 1 with the viscosity changeable liquid: alcohols such as methyl alcohol, ethyl alcohol, n-propyl alcohol, iso-propyl alcohol, n-butyl alcohol, sec-butyl alcohol, tert-butyl alcohol, iso-butyl alcohol, furfuryl alcohol, and tetrahydrofurfuryl alcohol; ketones or ketone alcohols such as acetone, methyl ethyl ketone, and diacetone alcohol; alkanolamines such as monoethanolamine, diethanolamine, and triethanolamine; amides such as dimethylformamide and dimethylacetonamide; ethers such as tetrahydrofuran and dioxane; esters such as ethyl acetate, methyl benzoic, ethyl lactate, and ethylene carbonate; polyhydric alcohols such as ethylene glycol, diethylene glycol, triethylene glycol, propylene glycol, tetraethylene glycol, polyethylene glycol, glycerine, 1,2,6-hexanetriole, and thiodiglycol; alkylene glycol lower monoalkyl ether or alkylene glycol lower dialkyl ether such as ethylene glycol monomethyl ether, ethylene glycol monoethyl ether, diethylene glycol monomenthyl ether, diethylene glycol monoehtyl ether, propylene glycol monomehtyl ether, propylene glycol menoethyl ether, diethylene glycol dimethyl ether, and diethylene glycol diethyl ether; diethers; and nitrogen ring compounds such as pyrrolidone.

It is preferable to utilize polyhydric alcohols or polyhydric alcohol alkyl ethers, and more preferable to utilize polyhydric alcohols such as diethylene glycol for further improvement of the pigment dispersion ink properties. The pigment dispersion ink generally contains 10 to 90 percent of these ingredients by weight; however, a desirable range in order to maintain less temperature dependency on the material property is from 20 to 70 percent by weight. Also the pigment dispersion ink usually contains 5 to 90 percent water by weight, the preferable range is from 10 to 70 percent, and most preferable range is from 20 to 70 percent by weight.

Any organic or inorganic pigments including the conventionally used ones can be utilized as the pigment for the pigment dispersion ink: for example, pigments such as azo series, phthalocyanine series, quinacridone series, anthraquinone series, dioxazine series, indigo series, thioindigo series, perynone series, perylene series, isoindolenone series, titanium oxides, cadmium series, iron oxide series, and carbon black. The particle diameter of these pigments ranges from several hundred millimicron to several micron, and it is more desirable to utilize water paste pigment immediately after the production process. The pigment dispersion ink preferably contains 3 to 30 percent pigments by weight when influence on tinting strength and viscosity are expected.

Other dispersion agents utilized for the pigment dispersion ink are: nonionic surfactants such as polyoxyethylene alkyl ether, polyoxyalkyl phenyl ether, polyoxyethylene fatty acid ester, polyoxyethylene polyoxy propylene bock copolymer; anionic surfactants such as higher alcohol ester sulfate, ester sulfate of polyoxyethylene adduct, and alkylsulfate of fatty alkylamide; and cationic surfactants such as higher alkylammonium halide. The pigment dispersion ink generally contains less than 20 percent surfactants by weight, and preferably contains less than 15 percent of them by weight.

In order to further improve the dispersion of the pigment as well as the adhesion to the recording media, resin is added as solvent to the pigment dispersion ink. More than one natural or synthetic resin can be utilized among almost all solvable resins: polymethacrylate resin, acrylic ester-acrylic acid copolymer resin, vinyl resin such as polyvinyl pyrrolidone and polyvinyl butyral resin, hydrocarbon resin, phenol resin, xylene resin, ketone resin, alkyd resin, polyamide resin, polyester resin, maleic resin, cellulosic resin, rosin resin, water soluble acrylic resin, gelatin, casein, and shellac. The pigment dispersion ink generally contains 0.2 to 30 percent resins, and preferably 0.5 to 10 percent resins by weight. When it contains less than 0.2 percent resins by weight, not only pigment dispersion stability but also the adhesion to the recording media deteriorate.

In addition, other agents such as anti-corrosion, surfactants, lubricant, and perfume can be added to the pigment dispersion ink.

Also, the pigment dispersion ink can be produced through known methods; the above ingredients are kneaded and dispersed by machines such as a homomixer, a ball mill, a homogenizer, a sand mill, and a roll mill.

In addition to EVL, although any coloring materials can consist of the recording liquid 1, it is preferable to use emulsion hydrophobic silicone series solvent due to its anti-light and anti-water properties.

(Embodiment II)

The ink-jet type recorder of Embodiment II exploits mainly the change of the volume of EVL, therefore EVL is referred to as a volume changeable liquid herein.

Figure 14:
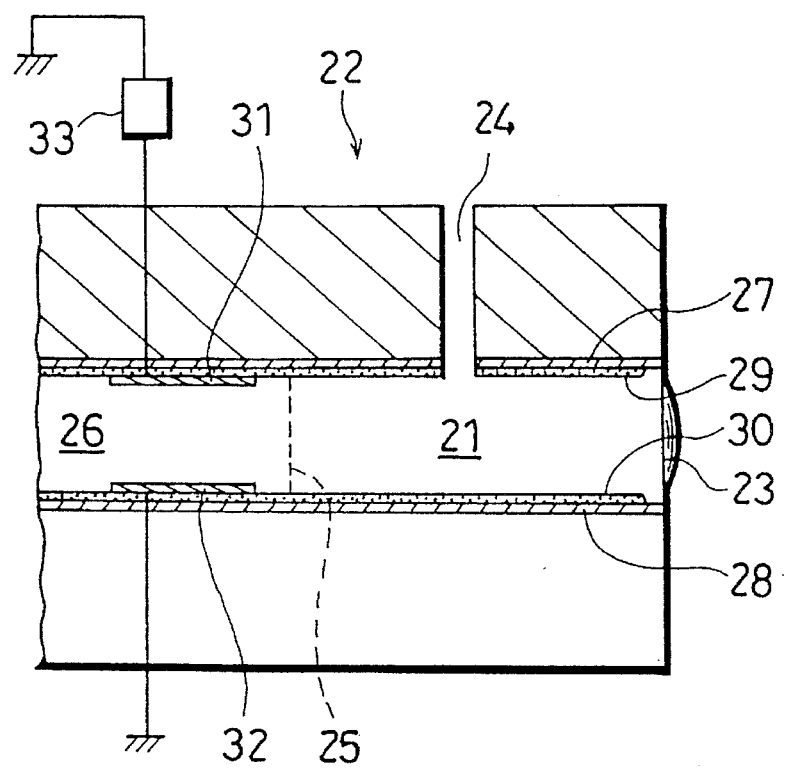
FIG. 14 is a schematic longitudinal side view of the major part of the ink-jet type recorder according to Embodiment II of the present invention.
Figure 15:
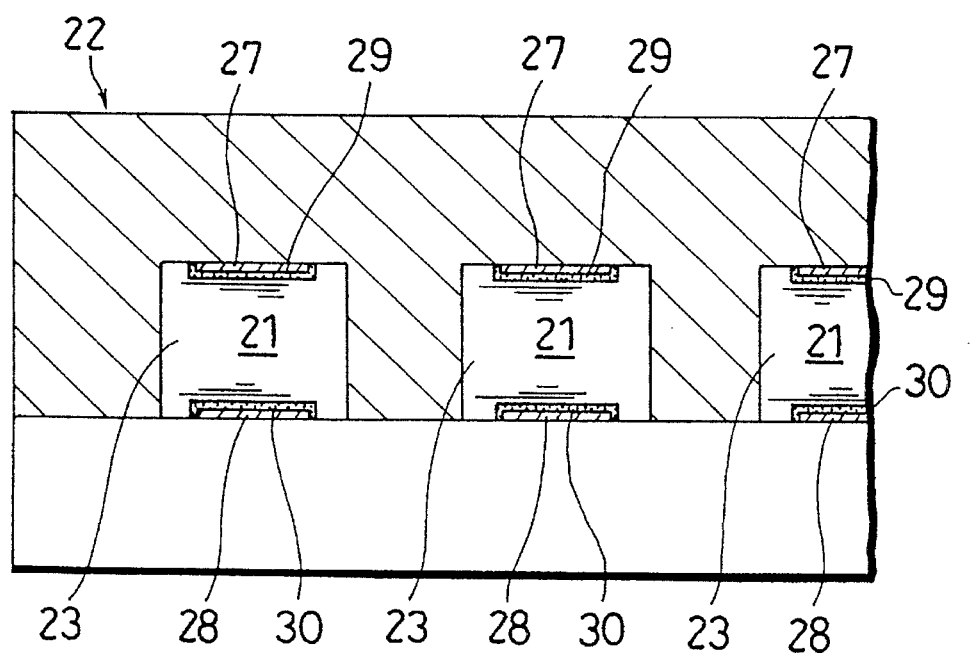
FIG. 15 is a schematic longitudinal front view of the major part of the ink-jet type recorder according to Embodiment II of the present invention.

FIG. 14 is a schematic longitudinal side view of the major part of the ink-jet type recorder, and FIG. 15 is a schematic longitudinal front view according to Embodiment II. A recording liquid 21 and a volume changeable liquid 26 are withheld by way of two separate liquid phases contacting each other at one end denoted by numeral 25 in a space 22. Included in the space 22 are a plurality of nozzles 23 from which a jet of the recording liquid 21 spouts out and an ink supply passage for supplying the recording liquid 21, both formed at regular intervals and vertically to the drawing sheet of FIG. 14. The space 22 is equipped with a plurality of pairs of charging electrodes 27 and 28 for charging the recording liquid 21, which are covered with insulate protecting layers 29 and 30 except the periphery of the openings of the nozzles 23. The charging electrodes 27 are connected to unillustrated bias voltage impressers while the charging electrodes 28 are connected to the grounding. Also the space 22 is equipped with a plurality of pairs of the separate electrode 31 and opposing common electrode 32 for developing the electric field in the volume changeable liquid 26. Each separate electrode 31 is connected to the output terminal of respective voltage impressers 33 that impress positive or negative voltage depending to the image signal thereto, while all common electrodes 32 are connected through to the grounding. In addition, an unillustrated attraction electrode is placed so as to oppose the nozzles 23.

Unlike the ink-jet type recorder of Embodiment I, the ink-jet type recorder of Embodiment II is characterized in that EVL directly pumps out the recording liquid 21 from the nozzles 23 by exploiting the volume change thereof; otherwise it has substantially the same construction shown in FIGS. 11 and 12.

In Embodiments I and II, although the voltage impressers 7 and 33 can be either placed separately or mounted on the spaces 2 and 22, manufacturing costs including that for wire bonding and for parts mounting increase proportionally to the numbers of the nozzles 3 and 23 in the latter case. However, these costs can be reduced when a structure that controls the impress of the voltage to the separates electrodes 4 and 31 is added thereto; the light from an inexpensive light writing head such as a light head for a laser printer or an LED (Light Emitting Diode) printer scans photoconductive layers connected to each electrodes 3 and 41 at one end.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An ink-jet type recorder comprising:

reserving means for reserving a liquid including a liquid withholding unit having a single space divided into a first portion for withholding electroviscous liquids and a second portion for withholding a recording liquid, said electroviscous liquids being in contact with said recording liquid at one end of said electroviscous liquids;

a plurality of nozzles provided in said reserving means; and a plurality of pairs of electrodes for impressing a voltage to the electroviscous liquids withheld in the reserving means, wherein the voltage impressed by the pairs of electrodes is controlled in order to change a volume of the electroviscous liquids so that electroviscous liquids directly pump out the recording liquid onto recording media through the plurality of nozzles.

2. An ink-jet type recorder of claim 1, wherein the pairs of electrodes are provided in the first portion of the liquid withholding unit.

3. An ink-jet type recorder of claim 2, wherein each of the pairs of electrodes consists of a separate electrode and a common electrode.

4. An ink-jet type recorder of claim 1, the ink-jet type recorder further comprising an attraction electrode placed so as to oppose the plurality of nozzles.

5. An ink-jet type recorder of claim 1, wherein the electroviscous liquids comprise a suspension of solid particles in insulate liquid dispersion media.

6. An ink-jet type recorder of claim 5, wherein the dispersion media are selected from a group consisting of mineral oil, silicone oil, fluorine compounds, and synthesized hydrocarbons.

7. An ink-jet type recorder of claim 5, wherein the solid particles are selected from a group consisting of hydrate polymer particles represented by absorptive polymer crosslinking particles and ion exchange resin particles, zeolite particles, silica gel particles, and ceramics particles.

8. An ink-jet type recorder of claim 5, wherein the electroviscous liquids consist of silicone oil, water, and silica.

9. An ink-jet type recorder of claim 8, wherein the electroviscous liquids further include a silane coupling agent.

10. An ink-jet recorder of claim 1, wherein a supply passage for supplying the recording liquid is provided at the second portion of the liquid withholding unit in the reserving means.

11. An ink-jet type recorder comprising:

a reserving portion including a liquid withholding unit which separately withholds a first liquid to record on recording media and a second liquid to pump out the first liquid, a volume of the second liquid being changeable by a voltage applied thereto;

a plurality of nozzles provided in said reserving portion; and a plurality of pairs of electrodes which apply a voltage to the second liquid in the withholding unit so that the second liquid, a volume of which is changed, pumps out the first liquid onto recording media through the nozzles.

12. An ink-jet type recorder of claim 11, wherein the pair of electrodes are provided at a portion where the second liquid is withheld in the reserving portion.

13. An ink-jet type recorder of claim 11 further comprising:

an attraction electrode placed so as to oppose the nozzles.

14. An ink-jet type recorder of claim 11, wherein a supply passage for supplying the first liquid is provided at a portion where the first liquid is withheld in the reserving portion.

* * * * *

UNITED STATES PATENT AND TRADEMARK OFFICE
CERTIFICATE OF CORRECTION

PATENT NO. : 5,515,085
DATED : May 7, 1996
INVENTOR(S) : Hideo Hotomi, et al.

It is certified that error appears in the above-indentified patent and that said Letters Patent is hereby corrected as shown below:

In col. 1, line 19, change "contradiction" to --contraction--.

In col. 1, lines 32 and 33, change "contradiction" to --contraction--.

In col. 3, line 47, after "mark" (first occurrence) insert --●--; after "mark" (second occurrence) insert --○--.

In col. 3, line 48, after "mark" insert --△--.

In col. 6, line 65, change "separates" to --separate--.

Signed and Sealed this

First Day of October, 1996

Attest:

BRUCE LEHMAN

*Attesting Officer*　　　*Commissioner of Patents and Trademarks*